(12) United States Patent
Shirts

(10) Patent No.: US 12,731,851 B2
(45) Date of Patent: Sep. 8, 2026

(54) BATTERY WITH A CHANNEL THERETHROUGH

(71) Applicant: One Iron Investments, LLC, Washington, UT (US)

(72) Inventor: Casey Shirts, Washington, UT (US)

(73) Assignee: One Iron Investments, LLC, Tulsa, OK (US)

( * ) Notice: Subject to any disclaimer, the term of this patent is extended or adjusted under 35 U.S.C. 154(b) by 821 days.

(21) Appl. No.: 17/701,492

(22) Filed: Mar. 22, 2022

(65) Prior Publication Data

US 2022/0285782 A1 Sep. 8, 2022

Related U.S. Application Data

(63) Continuation of application No. 29/772,473, filed on Mar. 2, 2021, now Pat. No. Des. 975,644.

(60) Provisional application No. 63/165,606, filed on Mar. 24, 2021.

(51) Int. Cl.
*H01M 50/264* (2021.01)
*H01M 50/249* (2021.01)
*H01M 50/256* (2021.01)

(52) U.S. Cl.
CPC ....... *H01M 50/264* (2021.01); *H01M 50/249* (2021.01); *H01M 50/256* (2021.01); *H01M 2220/20* (2013.01)

(58) Field of Classification Search
CPC ............. H01M 50/249; H01M 50/256; H01M 50/264; H01M 2220/20
See application file for complete search history.

(56) References Cited

U.S. PATENT DOCUMENTS 4,129,194 A * 12/1978 Hammond .......... H01M 50/204 180/68.5
4,535,863 A 8/1985 Becker
4,926,953 A 5/1990 Platt
5,040,627 A * 8/1991 Swayze .................... B60K 1/04 180/68.5
2015/0089981 A1 4/2015 Renfro et al.
2019/0165341 A1 * 5/2019 Matte .................. H01M 50/553

FOREIGN PATENT DOCUMENTS

CN 211480149 U 9/2020
WO 2011136107 A1 11/2011

OTHER PUBLICATIONS

Machine Translation of CN 211480149 U (Year: 2020).*
Britannica Online, Battery Definition, Accessed Feb. 10, 2026, pp. 1-5, https://www.britannica.com/technology/battery-electronics.

(Continued)

*Primary Examiner* — Sathavaram I Reddy
(74) *Attorney, Agent, or Firm* — Gurr & Brande, PLLC; Robert A. Gurr

(57) ABSTRACT

A battery comprises a housing, which includes a first aperture and a second aperture on opposite sides of the housing and on the same axis, creating a channel therethrough. The first aperture and the second aperture and channel may receive a battery hold-down rod (e.g., a J-hook rod) therethrough to secure the battery to a golf cart, vehicle, or other object.

10 Claims, 10 Drawing Sheets

(56) References Cited

OTHER PUBLICATIONS

Chris William, Golf Cart Batteries Guide—(Everything You Need to Know), The Golf Elite, Jan. 6, 2024, pp. 1-8, https://www.thegolfelite.com/carts/accessories/golf-cart-batteries-guide-everything-you-need-to-know/.

Golf Cart Garage, Golf Cart Batteries: 6V, 8V, 12V, 36V, 48V, Golf Cart Batteries & More, pp. 1-13, https://www.golfcartgarage.com/golf-cart-batteries/ accessed Feb. 10, 2026.

* cited by examiner

BATTERY WITH A CHANNEL THERETHROUGH

CROSS-REFERENCE TO RELATED APPLICATIONS

This application is a continuation of U.S. Design Application 29/772,473, filed on Mar. 2, 2021, and further claims the benefit of U.S. Provisional Application Ser. No. 63/165,606, filed on Mar. 24, 2021, both of which are incorporated herein by reference.

TECHNICAL FIELD

The present disclosure relates to batteries. More particularly, the present disclosure relates to a battery with a channel therethrough so as to be securable to various objects, such as golf carts, vehicles, and other things.

BACKGROUND

Golf carts have been used for years to transport golfers around a golf course, increasing mobility of golfers. They have also been used for many other purposes, such as transportation for individuals at resorts and hotels. Generally, golf carts run on either gas or electricity. Electric golf carts have many benefits, some of which include cost savings, decreasing pollution, and providing ease of maintenance.

Even though there are many benefits to electric golf carts, there are also some shortcomings. One main problem is ensuring that the batteries are properly secured to the cart. If not properly secured, the batteries may shift, causing not only unwanted movement, but may also cause the battery connections to fail. Additionally, unwanted movement and vibration may also cause the battery itself to prematurely fail, such as by leaking.

Current methods and systems to secure golf cart batteries (referred to as "hold-downs") typically include rods and brackets. These rods and brackets are typically placed between batteries and are secured to the golf cart frame from an underside. Depending upon the battery bank configuration, it can be challenging to properly secure all the batteries. In many instances, some batteries in a bank are not as secured as others. As a result, some users have resorted to using straps across the top of the batteries, which typically does not provide for adequate securement.

Securing batteries to other vehicles (e.g., cars, trucks, etc.) often results in the same or similar problems as discussed above regarding golf carts. Indeed, batteries need to be secured in any moving object.

Accordingly, there is a need for a battery that easily accepts a battery hold-down rod so as to prevent unwanted movement in any vehicle or object. The present disclosure seeks to solve these and other problems.

SUMMARY OF EXAMPLE EMBODIMENTS

In one embodiment, a battery comprises a housing having a channel therethrough with a first aperture to the channel on a top side of the housing and a second aperture to the channel on a bottom side of the housing. The channel may receive a battery hold-down rod (e.g., a J-hook rod) therethrough to secure the battery to an object, such as a golf cart. More specifically, the battery may couple to the golf cart by passing the battery hold-down rod through the channel and then coupling the battery hold-down rod to the battery via a cap, washer, and nut. When removing, inserting, or transporting the battery, a user may utilize a first handle and a second handle coupled to the battery.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As discussed earlier, there is a need for a battery that easily accepts a battery hold-down rod so as to prevent unwanted movement. The battery disclosed herein solves these and other problems.

Figure 1:
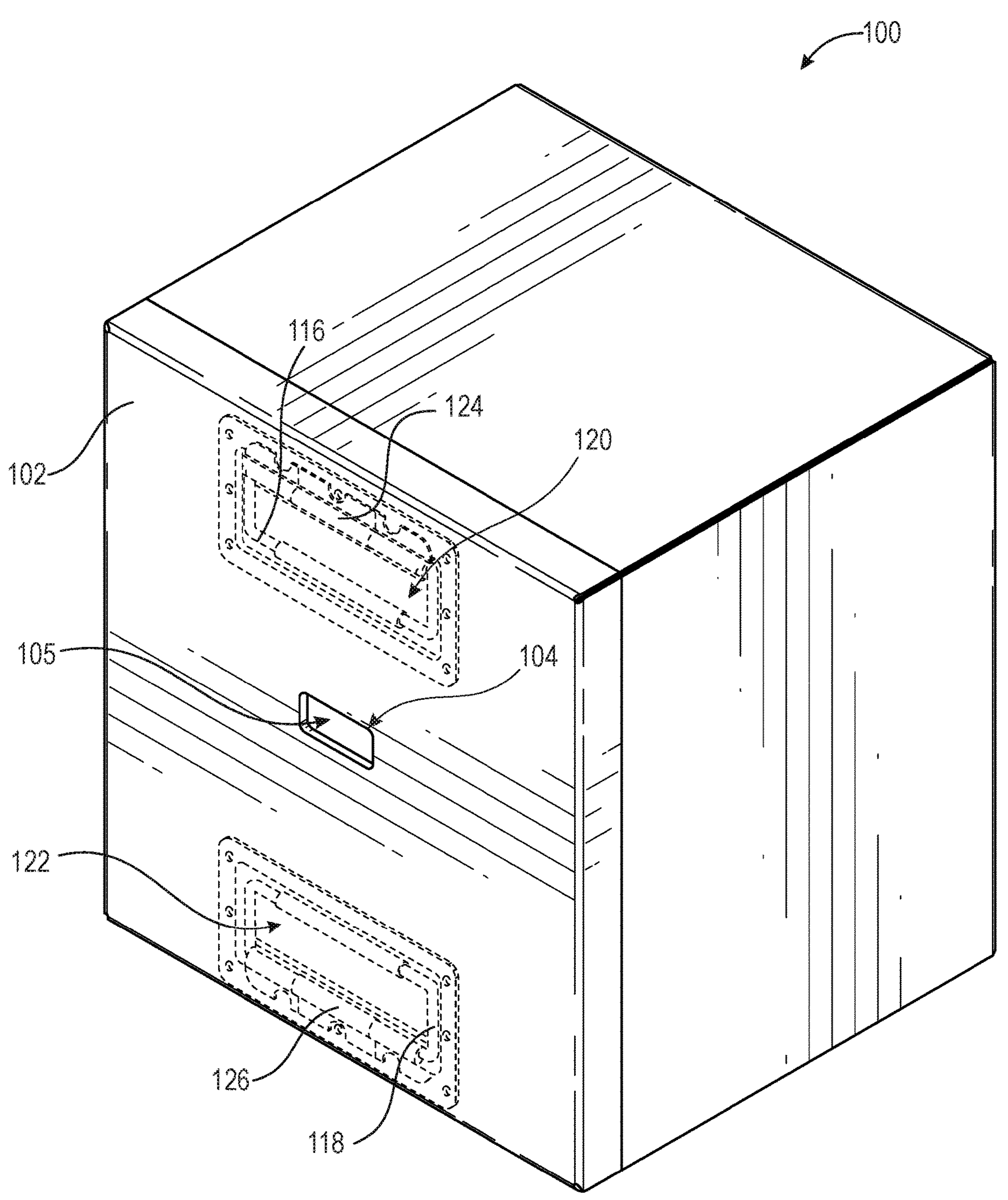
FIG. 1 illustrates a top, side perspective view of a battery.
Figure 2:
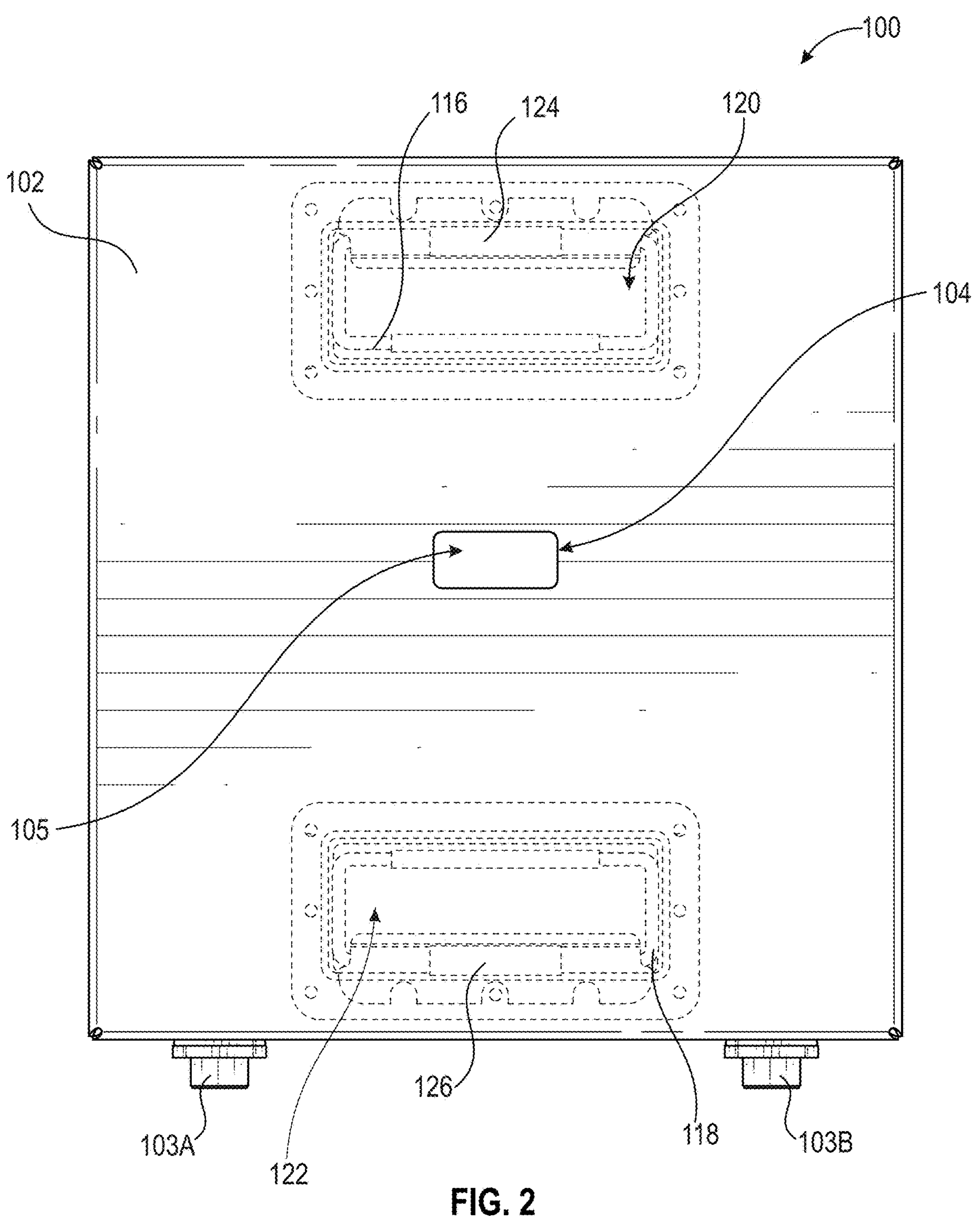
FIG. 2 illustrates a top plan view of a battery.
Figure 3:
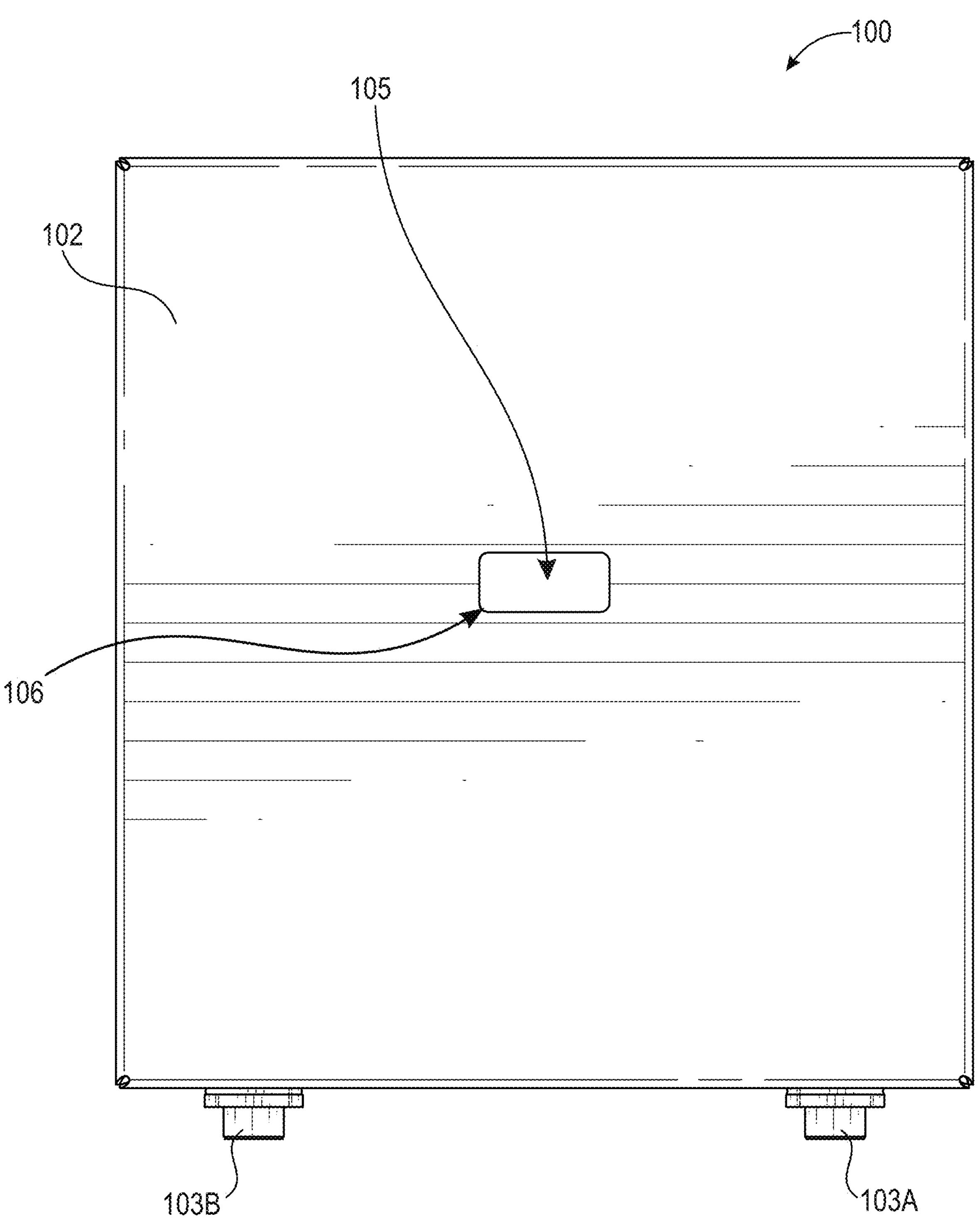
FIG. 3 illustrates bottom plan view of a battery.
Figure 4:
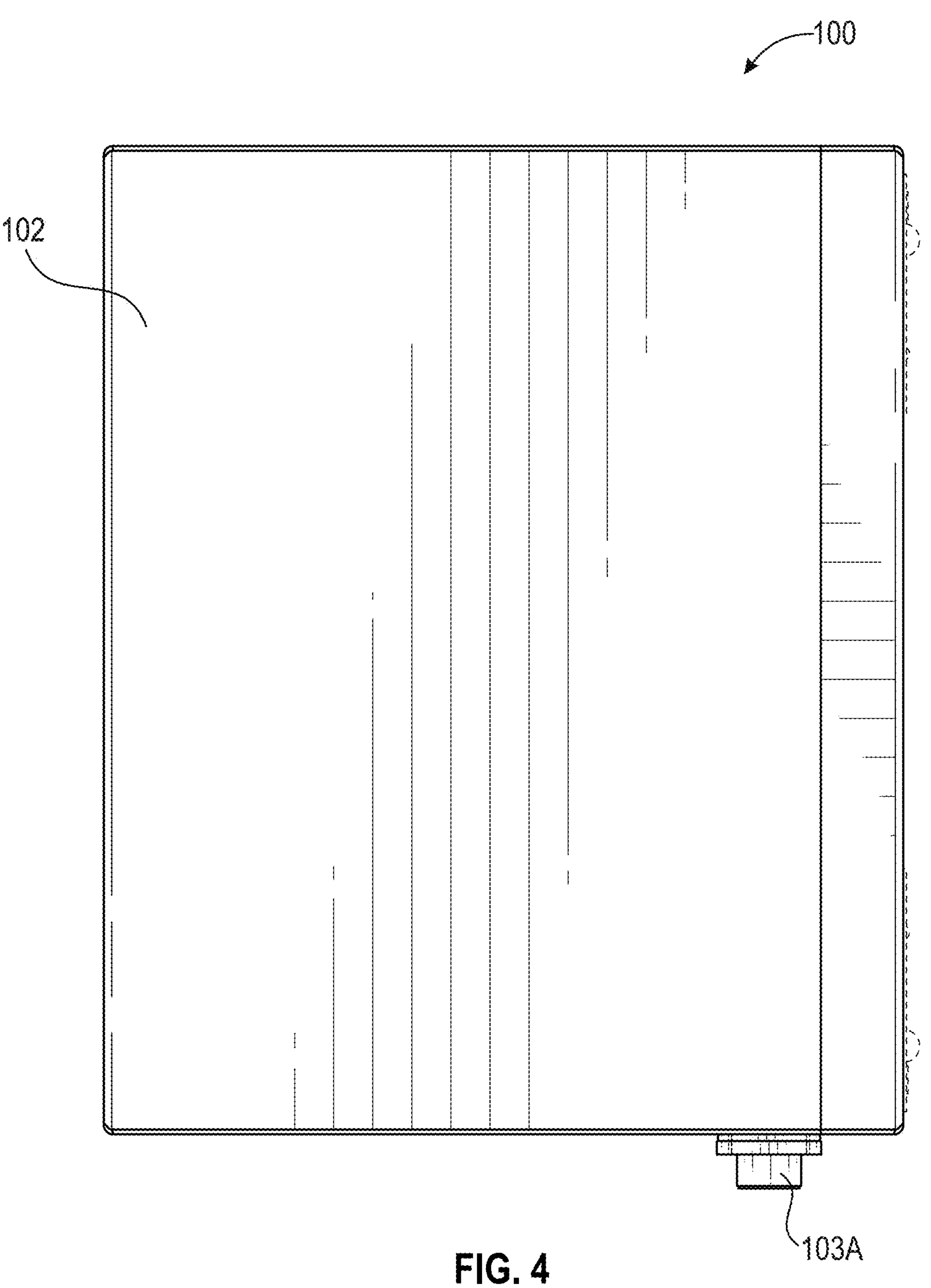
FIG. 4 illustrates a left side elevation view of a battery.
Figure 5:
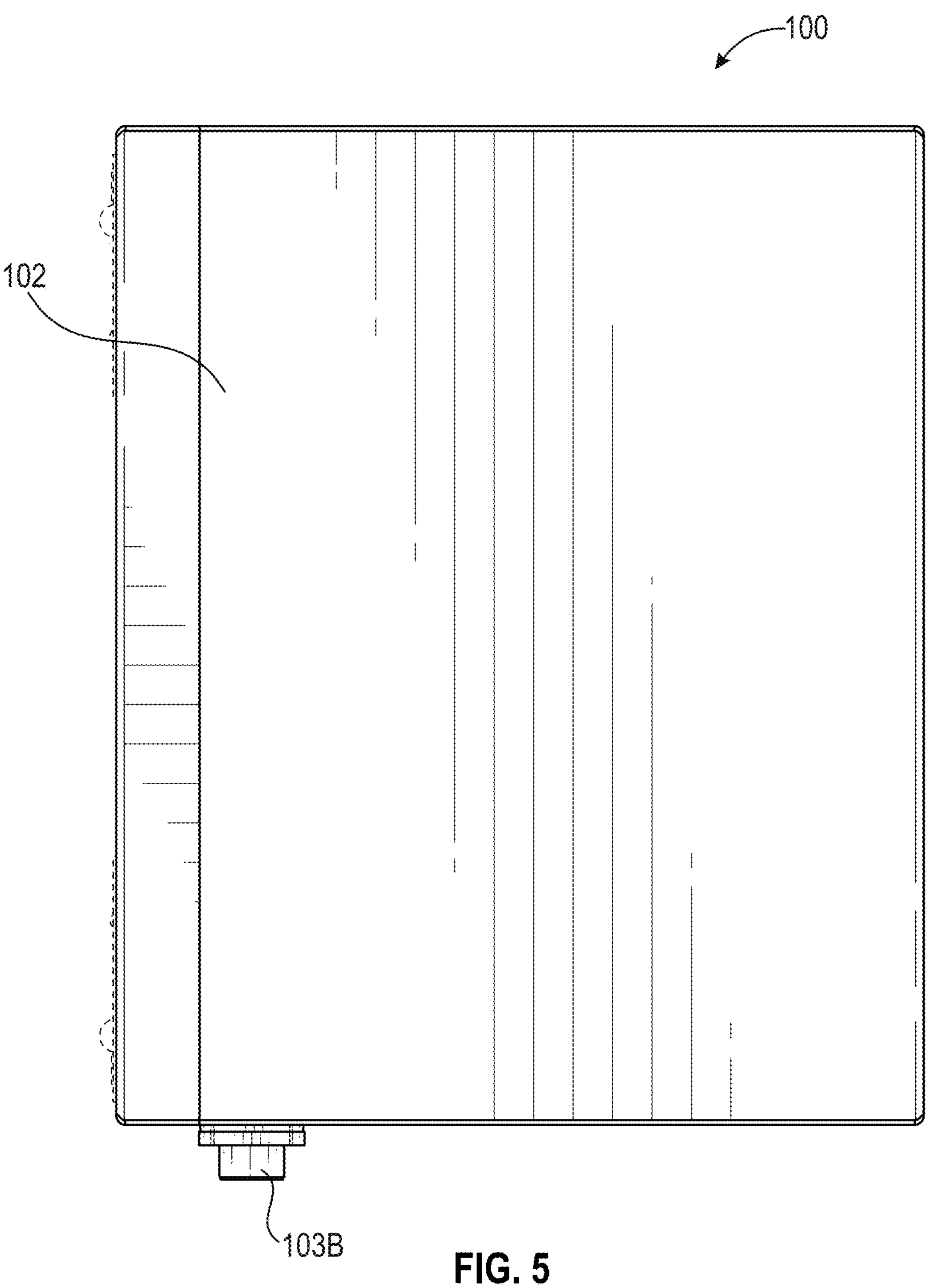
FIG. 5 illustrates a right side elevation view of a battery.
Figure 6:
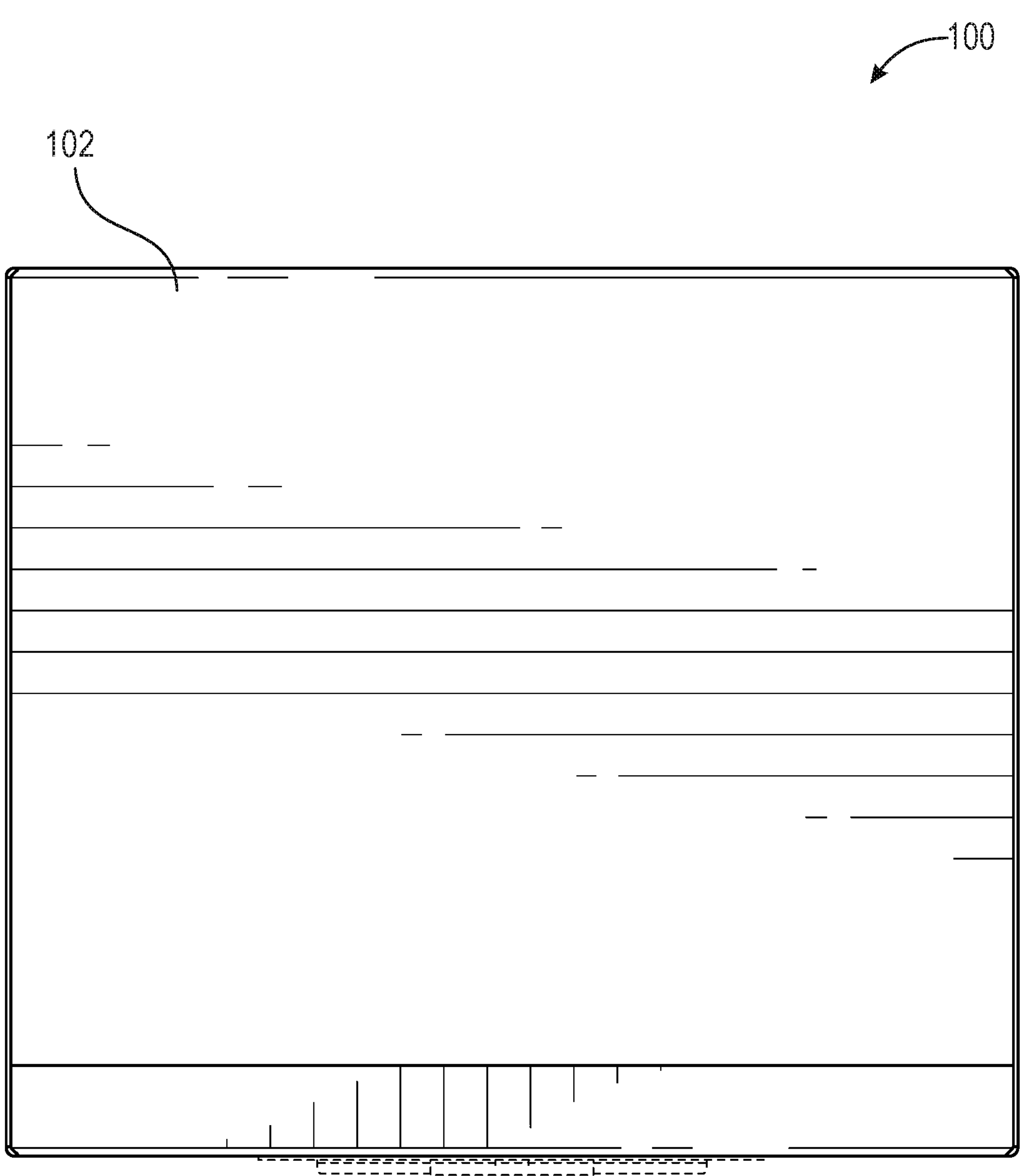
FIG. 6 illustrates rear elevation view of a battery.
Figure 7:
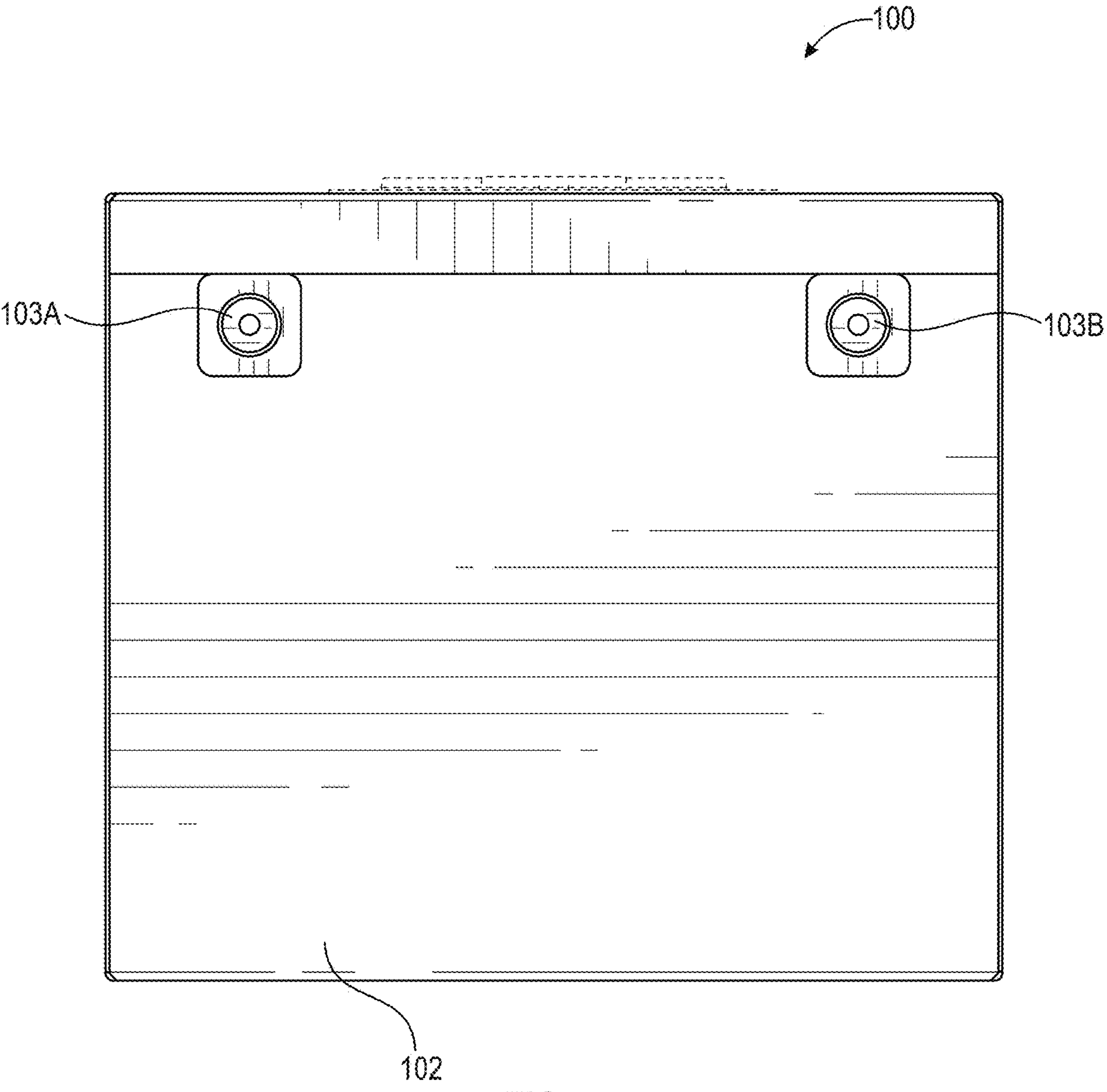
FIG. 7 illustrates a front elevation view of a battery.
Figure 8:
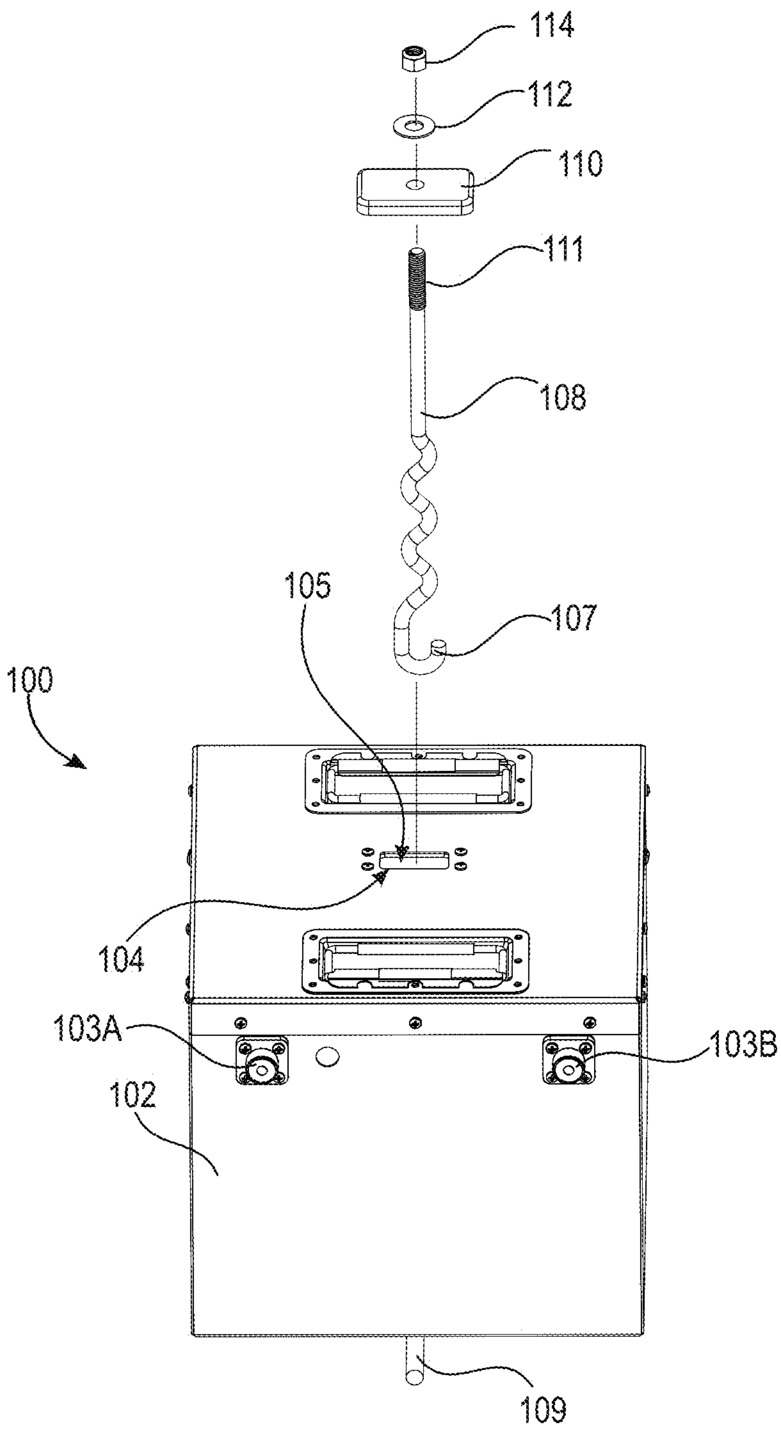
FIG. 8 illustrates a top, front perspective view of a battery with a hold-down rod de-coupled.
Figure 9:
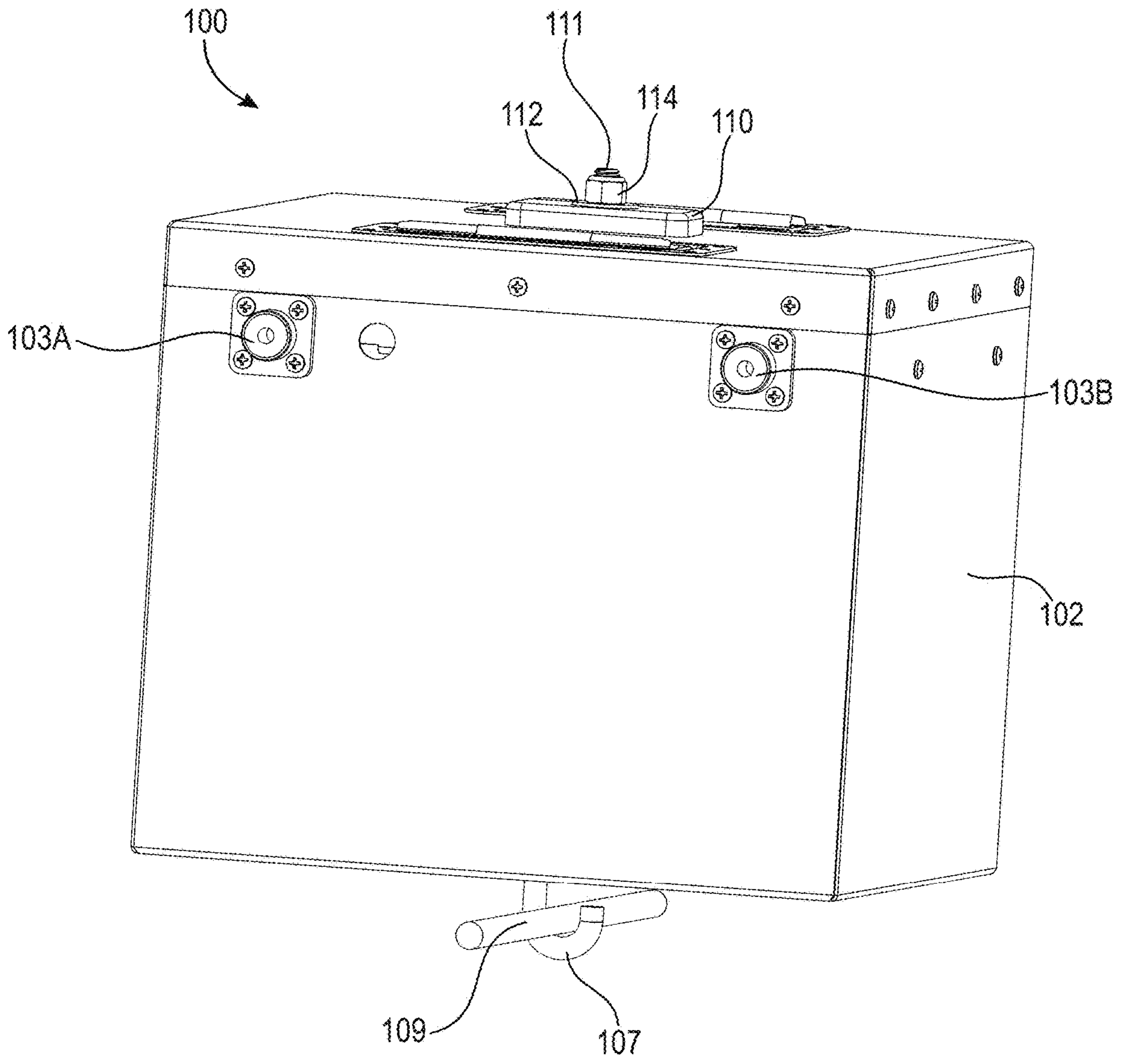
FIG. 9 illustrates a front perspective view of a battery with a hold-down rod coupled thereto.
Figure 10:
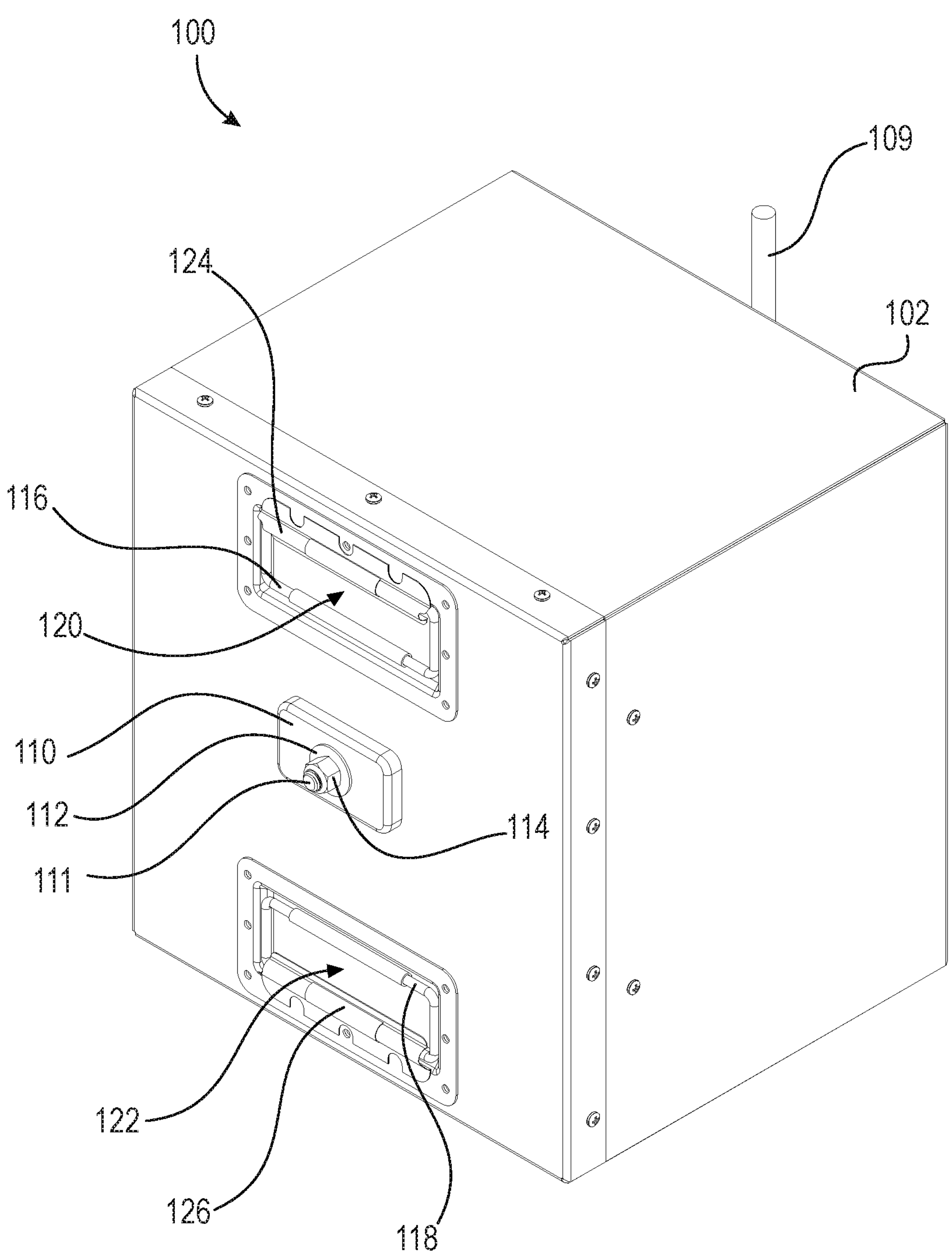
FIG. 10 illustrates a top, rear perspective view of a battery with a hold-down rod coupled thereto.

Generally speaking, the battery disclosed herein comprises a channel that passes through the battery, allowing it to easily accept a securement rod (also referred to as a "hold-down rod"). Referring now to FIGS. 1-10, in some embodiments, a battery 100 comprises a housing 102, which includes a first terminal 103A and a second terminal 103B on an outside surface, and a first aperture 104 on a top side and a second aperture 106 on the bottom side of the housing 102. The apertures 104, 106 are in the same axis, creating a channel 105 (e.g., open space) through the housing 102. The housing 102 may be manufactured from a plastic material or any other material suitable for batteries known in the art. As shown, the first aperture 104 and the second aperture 106 may be rectangular in shape. However, it will be appreciated that the shape of the first and second apertures 104, 106 may be circular, ovular, or any other shape sized so as to receive a hold-down rod 108 (FIGS. 8-10).

As best seen in FIGS. 8-10, the first aperture 104 and the second aperture 106 may receive the battery hold-down rod 108 (e.g., a J-hook rod) therethrough to secure the housing 102 to an object, such as a golf cart or other vehicle. More specifically, the housing 102 may couple to the golf cart by passing the battery hold-down rod 108 through the first and second apertures 104, 106 and channel 105, with the J-hook portion 107 engaging a crossbar 109 that is coupled to, or engages, the battery tray of a golf cart or other vehicle or object. The top portion 111 of the hold-down rod 108 accepts a cap 110 (which also helps to cover and/or seal the first aperture 104), washer 112, and nut 114. In other words, the top portion 111 may be threaded so as to receive the nut 114. As the nut 114 is tightened to the top portion 111, the J-hook portion 107 tightens to the crossbar 109, ensuring the battery 100 is properly secured. While a cap 110, washer 112, and nut 114 are shown, it will be appreciated that cotter pins, latches, or other securement mechanisms may be used to secure the housing 102 to the hold-down rod 108. Additionally, the cap 110 may be threaded so as to function as both a cap and a nut. The cap may be sized so as to cover the first aperture 104 regardless of horizontal orientation.

Because each battery 100 in a bank may be individually secured to the cart, unwanted movement of batteries is completely eliminated, solving the problems earlier described in the industry. Additionally, the battery 100 disclosed herein makes a uniform method for securing batteries to a golf cart, eliminating the plethora of hold-down brackets and rods that currently exist for differing brands and models.

Additionally, when removing, inserting, or transporting the battery 100, a user may utilize a first handle 116 and a second handle 118 coupled to the battery 100. The first and the second handles 116, 118 may both be positioned in a first recessed portion 120 and a second recessed portion 122, respectively. The first handle 116 may be coupled to the first recessed portion 120 via a hinge 124, or any other coupling mechanism. The second handle 118 may be coupled to the second recessed portion 122 via a hinge 126, or any other coupling mechanism. It will be appreciated that t-handles, knobs, or any other type of handle may be used. Further, in some embodiments, the battery 100 may not have handles.

Therefore, each battery 100 may be easily maneuvered and secured to a golf cart, vehicle, or other object, overcoming issues in the art. While some examples were given herein with golf carts, it will be appreciated that the battery 100 disclosed herein can be used with any object containing a battery and is not limited to golf carts and other vehicles. It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A single golf cart battery, comprising:

a housing;

a first aperture through a central portion of a top wall of the housing;

a second aperture through a central portion of a bottom wall of the housing;

wherein the first aperture and the second aperture are aligned to define a continuous channel through the housing that:

a. extends entirely from the top wall to the bottom wall of the housing, and b. is fully enclosed by the housing along an entire length of the channel;

two terminals extending outwardly from an exterior surface of the housing; and a hold-down rod sized so as to be receivable through the channel.

2. The single golf cart battery of claim 1, wherein the hold-down rod comprises a J-hook portion.

3. The single golf cart battery of claim 2, wherein the hold-down rod comprises a threaded top portion.

4. The single golf cart battery of claim 1, further comprising a cap positionable over the first aperture.

5. The single golf cart battery of claim 4, wherein the cap receives a threaded top portion of a hold-down rod.

6. The single golf cart battery of claim 1, further comprising a plurality of handles.

7. A single golf cart battery, comprising:

a housing;

two terminals extending outwardly from an exterior surface of the housing;

a first aperture through a first side of the housing;

a second aperture through a second, opposite side of the housing;

wherein the first and second apertures are aligned to define a continuous, fully enclosed channel that is bounded on all sides by walls of the housing and extends completely through the housing;

a hold-down rod positionable through the first aperture, the fully enclosed channel, and the second aperture;

the hold-down rod comprising a J-hook portion on a bottom end and a threaded top end, the J-hook configured to engage a crossbar;

a cap configured to receive the threaded top end of the hold down rod, the cap sized so as to cover the first aperture; and a nut for securing the hold-down rod to the cap.

8. The single golf cart battery of claim 7, further comprising at least one handle.

9. The single golf cart battery of claim 8, comprising a plurality of handles.

10. The single golf cart battery of claim 9, wherein each handle is received in a recessed portion of the housing, each handle hingedly coupled to the respective recessed portion.

* * * * *